UNITED STATES PATENT OFFICE.

FRANCIS NORWOOD BARD, OF HIGHLAND PARK, ILLINOIS.

COMPOSITE NON-METALLIC GASKET.

1,346,524.  Specification of Letters Patent.  Patented July 13, 1920.

Application filed November 1, 1919. Serial No. 335,020.

*To all whom it may concern:*

Be it known that I, FRANCIS NORWOOD BARD, a citizen of the United States, and a resident of the city of Highland Park, in the county of Lake and State of Illinois, have invented certain new and useful Improvements in Composite Non-Metallic Gaskets, of which the following is a specification.

My present invention relates in general to gasketing material, and more particularly molded gaskets, and has special reference to the provision of an improved type of molded gasket, peculiarly adapted for use in connection with flexible joints.

Flexible joints, such as those in which gaskets embodying my present improvements find one of their largest fields of utility, are commonly used as members in the connection of the air and steam pipe lines between railway train elements, as for example between the locomotive and tender or between cars.

Such flexible fluid connections must not only be fluid tight, in order to avoid wastage of material, but also in order to avoid interference with the operation of the train since, for example, a leak in the train pipe of the air-brake system if long enough continued would lead to uncalled for application of the brakes.

In practice I have found that metallic gaskets are unsatisfactory for a number of reasons, among which may be mentioned, difficulty in keeping them sufficiently tight to prevent leakage, a tendency to score or otherwise cut the metallic joint members (which renders them markedly unsuitable in cases such as ball-and-socket joints where the ball member has to be highly finished in order to maintain a tight joint,) an active corrosion when oxidizable metals are employed and an inherent tendency to stick or freeze when non-corrosive metals, such as bronzes and brasses, are employed in the manufacture of the joints.

On the other hand, such non-metallic gaskets as are known to me have proven unsatisfactory in service owing to the fact that if they are made of metal soft enough to make a satisfactorily tight joint, there is a marked tendency toward distortion upon the application of pressure sufficient to keep the joint tight, this even to the extent of lateral spreading and bulging of the packing material, whereas if they are made of material sufficiently rigid to resist such tendency to distortion, not only are the packing qualities, as such, reduced, but the gaskets easily become chipped, broken or otherwise leaky and inefficient in service.

I am aware that it has been proposed to minimize some of the objections above referred to by providing a gasket having a relatively softer wearing body with a relatively harder metallic facing at certain points, but I have found that while the employment of such facings may properly be considered to represent a material step in advance in the art, they are still open to all of the objections of metal as such.

Moreover, they are subject to further criticism in this that it is found in practice that such metallic facings become loosened from the gasket wearing body proper owing to the fact that no true union can be obtained between the non-metallic gasket body and the metallic facing.

Further, it is not practicable, in manufacturing procedure, to produce such metallic facings in all of the different sizes desirable to meet the varying conditions of service owing to the fact that such facings have to be made by complex and expensive machinery and processes.

My present invention contemplates further the provision of an improved type of gasket construction which, while particularly useful in connection with fluid-tight ball-and-socket joints, has also a general field of utility in stuffing-boxes of various applications.

Stuffing-boxes known to me are characterized in general by the employment of three elements, in combination with the casing and the member movable relatively thereto, viz: the packing material, the follower or gland bearing thereagainst, and the auxiliary means for forcing the follower against the packing in order to compress it and for holding the follower in predetermined position against movement relatively to the casing of the stuffing-box and thence the packing under compression.

In so far as known to me, no means has been provided for dispensing with such holding means, much less presenting the packing and follower in the form of a unitary structure.

My present invention presents additionally features of advantage in that the packing and follower may be formed integrally, and such integral structure and the stuffing-boxes may be arranged for coöperation in such a manner that the holding means can be dispensed with.

The primary objects of my invention, therefore, are the provision of an improved gasket structure which will present all of the advantages of the metallic types, the non-metallic types, and the composite types; the provision of an improved composite non-metallic gasket which will present such advantages; the provision of a combined gasket and follower; the provision of an improved gasket structure obviating the need of the employment of holding means for forcing a follower or gland into contact with the packing material; and generally to provide an improved form of packing or gasket structure capable of making and maintaining a tight and at the same time a durable joint; together with such other objects as may hereinafter appear.

In addition to the objects referred to and certain additional benefits and advantages to be pointed out below, I have provided a construction, certain embodiments of which are disclosed in the accompanying drawing, wherein—

Figure 1:
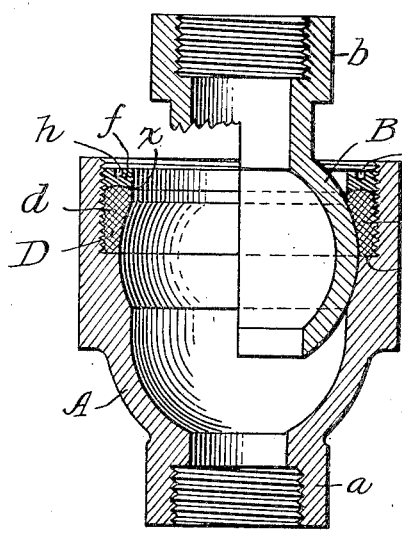
Figure 1 is a longitudinal section of a ball-and-socket joint including a gasket embodying my present improvements.

On inspection of the drawings it will be clear that in each of Figs. 1 to 4 one half of the ball member of the joint is cut away to prevent it from obscuring the view of certain features which it is desired to disclose most clearly.

Similarly, in each of the said figures of the drawing, I have for convenience of illustration of the use of my improved form of gasket, shown a socket member A having a suitable terminal $a$ for coupling it to a pipe, the opposite end being ball-mounted to provide a socket for the reception of a ball member B, which has a terminal $b$ by means of which it may be coupled to another pipe.

The socket member A has formed within it an annular shoulder $c$ which forms a seat for the gasket structure D.

Figure 4:
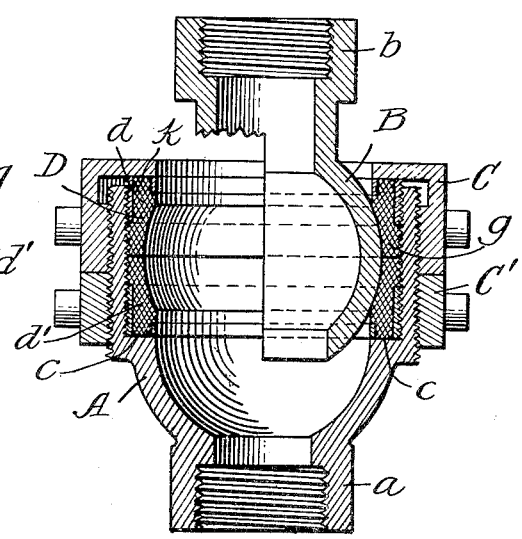

The socket member A may be exteriorly threaded, as shown in Fig. 4 for engagement with a cap member C which presses against the outer portion $d$ of the gasket structure D and holds it in contact with the ball B.

When desired, a lock-nut C' may be employed as an auxiliary for preventing movement of the cap C from its predetermined relation to the socket A.

The inner or wearing surface of the annular gasket structure D conforms, of course, closely to the contour of the ball B with which it is associated, and the external surface of the gasket structure D is, of course, of a contour to conform with the socket formed on the interior of the socket member A between the shoulder $c$ and the outer end of the gasket structure D, such socket being shown in the drawings as of cylindrical form.

Figure 2:
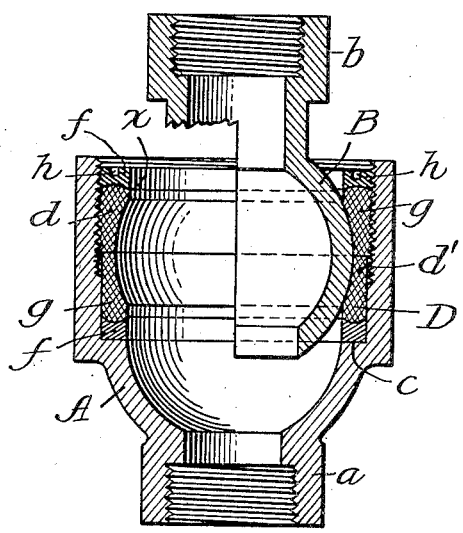
Figs. 2, 3 and 4 are further views of such ball-and-socket joint, including different forms of gaskets embodying my present invention.
Figure 3:
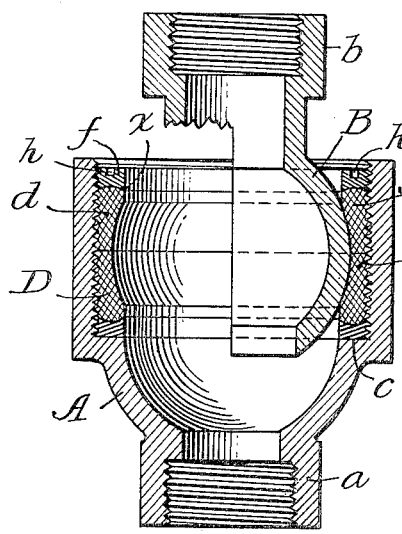

Further, referring to Figs. 1, 2 and 3 of the drawings, it will be understood that as circumstances may suggest as convenient, as in making compensation for unusual wear, a single gasket $d$ may be employed, as in Fig. 1, when the mechanical pressure on the gasket is practically all in one direction as in Fig. 1 wherein the pipe structure may be considered as subject to tension; a pair of coöperating gaskets $d$ and $d'$ may be employed, as in Fig. 2, in circumstances where the part $d'$ requires frequent replacement, as in cases where the pipe is under compression; or the gasket may be of two homologous parts, as shown in Figs. 3 and 4, which may be useful in cases of extraordinary wear requiring frequent tightening, such latter structure being further particularly useful in cases of unequal wear of the two halves, since they may be readily reversed in position, or, if one of them is still capable of efficient service, the one finally worn out may be replaced.

On inspection of each of the Figs. 1 to 4 of the drawings, it will be observed that the socket member C is internally threaded for at least a portion of its length and on viewing Figs. 1 to 5 of the drawings, it will be observed that each of the gasket portions $d$ there shown is exteriorly threaded, but that the inner gasket portion $d'$ of Fig. 2 is plain on its exterior surface and of a smaller diameter than the gasket portion $d$ thereof in order that such portion $d'$ may be slipped into position without interference with or by the outer threaded portion of the socket C.

The outer edge of each gasket member is preferably squared as indicated at $x$ to afford a cylindrical extension beyond the inner concave wearing surface of the gasket, because this renders possible a material augmentation of the life of the gasket without any variation of its action upon the ball, since the wear may extend through to the transverse outer surface of the gasket without the gasket varying its contact with such ball.

In carrying out my invention, I have found it desirable to form the outer parts of the gasket members, that is those which are out of contact with the ball B, or in contact with the shoulder $c$ when out of such contact with the ball B, or have any tendency toward lateral distortion, whether toward the ball B or toward overlapping the outer edge of the bell-mouth of the socket A, from such relatively hard non-metallic material as "bakelite" or "red fiber," which on the one hand is free from any tendency to seize metallic surfaces, to flow, to chip, or to break down, under pressure, or to expand or contract upon change of temperature, and on the other hand may not only be molded to exact dimensions, including the formation of suitable threads but also are susceptible of forming a mechanically perfect joint with a suitable relatively softer non-metallic packing or gasketing substance such as the composition of rubber and asbestos or other suitable resistant fibrous material, which I preferably employ in forming the wearing surfaces of the gasket, (that part of the surface therebetween which contacts with the ball B) and which, while it may not only be molded to precise dimensions and may be relied upon to conform closely to contour of the ball without either seizing the ball or permitting the passage of fluid around the ball and thence to the atmosphere, nevertheless has not the degree of mechanical strength desired in order that reliance may safely be placed upon the strength of the threads formed thereon in holding the gaskets in position.

In practice, the backing $f$ of the gasket may be formed, and then the wearing surface $g$ united thereto by heat and pressure, when forming a gasket employing such materials as above suggested.

The gasket arrangements shown in the several figures of the drawings, will, it is clear, also constitute a non-metallic packing and separation between the inner wall of the cap carrying socket A and the ball B to prevent not only leakage therebetween but abrasive contact of the relatively movable surfaces of such two metallic parts of the flexible joint, thus attaining the two crucial objects of my invention, a tight joint and a durable joint.

A further desideratum is attained by the employment of the composite gasket structure just described in this that when the ball in service has worn the gasket down to a point where the backing of the gasket is exposed to contact with the ball B, such backing being relatively softer than the ball B (when such backing is made of such material as "bakelite" or "red fiber") has no tendency toward abrasion of the ball B.

Figure 5:
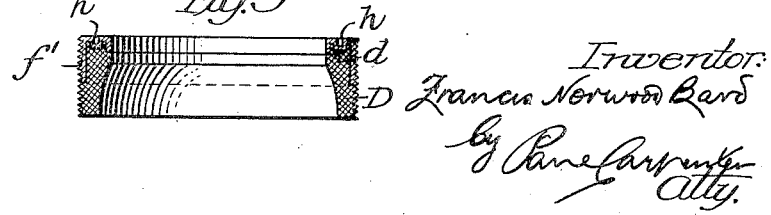
Fig. 5 is a view of still another form of my improved gaskets.

While I consider the form of the gasket shown in Figs. 1, 2 and 3 the preferable form for most purposes, the backing being in the form of a ring $f$, provided with openings $h$ adapted to receive a spanner wrench, the said backing may be of a channel like form such as is shown in Fig. 5.

Alternately, two concentric annuli $f^2$, $f^3$, such as are indicated in Fig. 4 may be used for forming the backing, and when such a construction is employed, as well as where other forms of structure are employed, a cap C (and even a lock-nut C') may be utilized in case it is desired to give further assurance against movement of the gasket relatively to the socket, or where the pressure is so great that there is any marked tendency toward distortion of the relatively soft material forming the packing $g$. In such cases the cap C, by its contact with the gasket adjacent to the point $k$, forms a further guard against leakage occurring along the lines of the threaded connection between the gasket $d$ and the socket C.

It will be apparent that by the employment of the concentric rings of Fig. 4 or the channel like structure of Fig. 5, a relatively large volume of wearing face is available for any proposed service of the gasket.

Having thus described my invention and illustrated its use, what I claim as new and desire to secure by Letters Patent is:

1. In a stuffing-box, the combination with an interiorly threaded casing, and a member movable therein, of an exteriorly threaded self accommodating packing for preventing the passage of fluid between said movable member and casing.

2. In a stuffing-box, the combination with an interiorly threaded casing, and a member movable therein, of a molded packing and an exteriorly threaded gland or follower acting on said packing for preventing the passage of fluid between said movable member and casing.

3. In a stuffing-box, the combination with an interiorly threaded casing, and a member movable therein, of a packing and gland or follower both exteriorly threaded for preventing the passage of fluid between said movable member and casing.

4. The combination in a gasket construction of a packing member and a follower member, part of said gasket construction being composed of exteriorly screw threaded self accommodating material.

5. In a stuffing-box, the combination with an interiorly threaded casing, and a member movable therein, of a packing, an exteriorly threaded gland or follower acting on said packing for preventing the passage of fluid between said movable member and casing, and means acting on the gland for preventing relative movement of the gland and casing.

6. In a stuffing-box, in combination, a casing, a member therein movable relative thereto, and a self-accommodating packing for preventing the passage of fluid between said movable member and casing, said packing bearing on one surface against said movable member, another surface thereof and said casing being threaded for inter-engagement.

7. In a stuffing-box, in combination, a casing, a member therein movable relative thereto, a molded packing member in said casing, and a gland bearing on said packing, said packing bearing on one surface against said movable member, and said gland and said casing being threaded for interengagement whereby said packing may be placed under compression.

8. In a stuffing-box, in combination, a casing, a member therein movable relative thereto, a packing for preventing the passage of fluid between said movable member and casing, a gland bearing on said packing, and means acting on the gland for preventing relative movement of the gland and casing, the said packing bearing on one surface against said movable member, and said gland and said casing being threaded for inter-engagement whereby said packing may be placed under compression.

9. In a stuffing-box, in combination, a casing, a member therein movable relative thereto, and a composite plural part non-metallic packing for preventing the passage of fluid between said movable member and casing, said packing bearing on one surface against said movable member, another surface thereof and said casing being threaded for inter-engagement.

10. In a stuffing-box, in combination, with a casing, and a member movable relatively thereto, a composite gasket structure having a relatively softer inner wearing surface bearing against said movable member for preventing the passage of fluid between it and the casing and a relatively harder outer surface bearing against and normally immobile relatively to the casing.

11. In a stuffing-box, in combination with a casing, and a member movable relatively thereto, a composite gasket structure having a relatively softer inner wearing surface bearing against said movable member for preventing the passage of fluid between it and the casing and a relatively harder outer surface bearing against and normally immobile relatively to the casing, the casing and said last mentioned surface being inter-engaging.

12. In a stuffing-box, in combination with a casing, and a member movable relatively thereto, a composite gasket structure having a relatively softer inner wearing surface bearing against said movable member for preventing the passage of fluid between it and the casing and a relatively harder outer surface bearing against and normally immobile relatively to the casing, the casing and said last mentioned surface being threaded for inter-engagement whereby the softer portion of the gasket structure may be forced into contact with said relatively movable member.

13. In a stuffing-box, in combination with a casing, and a member movable relatively thereto, a composite gasket structure having an inner surface of which one portion is relatively softer and arranged to bear against said movable member and another portion is relatively harder, and an outer surface also relatively harder and bearing against the casing.

14. In a stuffing-box, in combination with a casing, and a member movable relatively thereto, a composite gasket structure having an inner surface of which one portion is relatively softer and arranged to bear against said movable member and another portion is relatively harder, and an outer surface also relatively harder and bearing against the casing, the casing and said last mentioned surface being inter-engaging.

15. In a stuffing-box, in combination with a casing and a member movable relatively thereto, a composite gasket structure having an inner surface of which one portion is relatively softer and arranged to bear against said movable member and another portion is relatively harder, and an outer surface also relatively harder and bearing against the casing, the casing and said last mentioned surface being threaded for inter-engagement whereby the softer portion of the gasket structure may be forced into contact with said relatively movable member.

16. In a stuffing-box, in combination with a casing and a member movable relatively thereto, a composite gasket structure having a relatively softer inner wearing surface bearing against said movable member for preventing the passage of fluid between it and the casing and a relatively harder outer surface bearing against and normally immobile relatively to the casing, and means acting on the gasket for preventing relative movement of the gasket and casing.

17. In a stuffing-box, in combination with a casing and a member movable relatively thereto, a composite gasket structure having an inner surface of which one portion is relatively softer and arranged to bear against said movable member and another portion is relatively harder, and an outer surface also relatively harder and bearing against the casing, and means acting on the gasket for preventing relative movement of the gasket and casing.

In testimony whereof I have hereunto signed my name in the presence of the two subscribed witnesses.

FRANCIS NORWOOD BARD.

Witnesses:
Louis S. Cole,
Paul Carpenter.